(12) United States Patent
Vinson et al.

(10) Patent No.: US 7,976,291 B2
(45) Date of Patent: Jul. 12, 2011

(54) MOTOR COOLER

(75) Inventors: Wade D. Vinson, Magnolia, TX (US); John P. Franz, Houston, TX (US); Troy Della Fiora, Spring, TX (US); Jeffrey M. Giardina, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 114 days.

(21) Appl. No.: 12/211,659

(22) Filed: Sep. 16, 2008

(65) Prior Publication Data

US 2009/0010771 A1 Jan. 8, 2009

Related U.S. Application Data

(62) Division of application No. 11/247,581, filed on Oct. 11, 2005, now Pat. No. 7,443,063.

(51) Int. Cl.
*F04B 39/02* (2006.01)
(52) U.S. Cl. ............ 417/366; 417/369; 417/423.1; 310/62; 310/58; 310/59
(58) Field of Classification Search .......... 417/368–369, 417/366, 423.1, 423.8, 84, 88–89; 415/176; 418/101, 83; 310/62–63, 58–59
See application file for complete search history.

(56) References Cited

U.S. PATENT DOCUMENTS

| | | | |
|---|---|---|---|
| 3,274,410 A | 9/1966 | Ragnar | |
| 3,303,995 A | 2/1967 | Boeckel | |
| 3,385,516 A | 5/1968 | Omohundro | |
| 3,449,605 A | 6/1969 | Wilson | |
| 4,574,210 A | 3/1986 | Wieland | |
| 4,583,911 A | 4/1986 | Braun | |
| 5,944,497 A | 8/1999 | Kershaw et al. | |
| 5,967,764 A | 10/1999 | Booth et al. | |
| 6,384,494 B1 | 5/2002 | Avidano et al. | |
| 6,386,276 B1 * | 5/2002 | Chen et al. | 165/121 |
| 6,491,502 B2 | 12/2002 | Hunt | |
| 6,700,235 B1 * | 3/2004 | McAfee | 310/52 |
| 6,773,239 B2 | 8/2004 | Huang et al. | |
| 6,828,700 B2 | 12/2004 | Cichetti, Sr. | |
| 6,888,725 B2 | 5/2005 | Kubo et al. | |
| 6,927,509 B2 | 8/2005 | Cichetti, Sr. | |
| 6,951,449 B2 | 10/2005 | Huang et al. | |
| 6,979,177 B2 | 12/2005 | Lin et al. | |
| 7,034,417 B1 | 4/2006 | Liu | |

(Continued)

FOREIGN PATENT DOCUMENTS

JP 2002242887 A 8/2002

*Primary Examiner* — Charles G Freay
*Assistant Examiner* — Todd D Jacobs

(57) ABSTRACT

A cooling fan includes an outer housing. A motor support is fixed to the outer housing and a motor is mounted to the motor support. A hub is coupled to the motor and, with the motor support, forms a motor enclosure that substantially surrounds the motor. Multiple blades extend radially from the hub and are arranged so as to generate a flow of air around the motor enclosure when the blades are rotated. The cooling fan also includes a motor cooler including a flow path through the motor enclosure, wherein the flow path has a first opening and a second opening, wherein the second opening is disposed within an area of lowered downstream pressure so as to develop a differential pressure between the first and second openings and generate a flow of air through the motor enclosure as the motor operates.

1 Claim, 3 Drawing Sheets

U.S. PATENT DOCUMENTS

| | | |
|---|---|---|
| 7,042,121 B2 | 5/2006 | De Filippis et al. |
| 7,078,834 B2 | 7/2006 | Liu |
| 7,122,924 B2 | 10/2006 | Lee |
| 7,166,939 B2 | 1/2007 | Voigt et al. |
| 7,201,562 B2 | 4/2007 | Liu et al. |
| 7,227,286 B2 | 6/2007 | Kudo et al. |
| 7,244,110 B2 | 7/2007 | Hong et al. |
| 7,300,262 B2 * | 11/2007 | Ku et al. .................. 417/366 |
| 7,616,440 B2 | 11/2009 | Franz |
| 2002/0070615 A1 | 6/2002 | Jakoby et al. |
| 2003/0210992 A1 * | 11/2003 | Huang et al. .............. 417/366 |
| 2004/0263008 A1 | 12/2004 | Voigt et al. |
| 2005/0067500 A1 * | 3/2005 | Hong et al. ................ 237/34 |

\* cited by examiner

MOTOR COOLER

CROSS-REFERENCE TO RELATED APPLICATION

This patent application is a divisional of and claims priority to commonly-owned, U.S. patent application Ser. No. 11/247,581 filed Oct. 11, 2005 now U.S. Pat. No. 7,443,063, which is incorporated herein by reference. This patent application may be related to commonly-owned, U.S. patent application Ser. No. 12/211,670.

BACKGROUND

Computer systems include numerous electrical components that draw electrical current to perform their intended functions. For example, a computer's microprocessor or central processing unit ("CPU") requires electrical current to perform many functions such as controlling the overall operations of the computer system and performing various numerical calculations. Generally, any electrical device through which electrical current flows produces heat. The amount of heat any one device generates generally is a function of the amount of current flowing through the device.

Typically, an electrical device is designed to operate correctly within a predetermined temperature range. If the temperature exceeds the predetermined range (i.e., the device becomes too hot or too cold), the device may not function correctly, thereby potentially degrading the overall performance of the computer system. Thus, many computer systems include cooling systems to regulate the temperature of their electrical components. One type of cooling system is a forced air system that relies on one or more cooling fans to blow air over the electronic components in order to cool the components.

The cubic feet per minute ("CFM") of air that can be moved across an electric device is an important factor in how much heat can be removed from the device. Thus, the capacity of a cooling fan is a critical factor in selecting an air mover for use in a cooling application. The CFM that a cooling fan can produce is governed a number of factors including: the total area of the blades generating the airflow, the free area provided for airflow through the fan, the design of the blades, and the power generated by the electric motor.

The electric motors used to power many cooling fans are brushless electric motors. Brushless motors utilize a cylindrical windings section with magnets disposed inside or outside the cylinder. As electrical current flows through the windings, the magnets rotate about the axis of the motor. The amount of current flowing through the windings determines the power that the motor produces. One limiting factor in the performance of the motor is that the heat produced by the windings is proportional to the amount of current flowing through the windings. Therefore, as power increases the heat generated by the windings also increases.

Performance of the motor may be limited because as temperature increases, efficiency and service life decrease. High temperatures tend to degrade insulation found in the windings section and decrease the performance of bearings supporting the rotating components of the fan.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
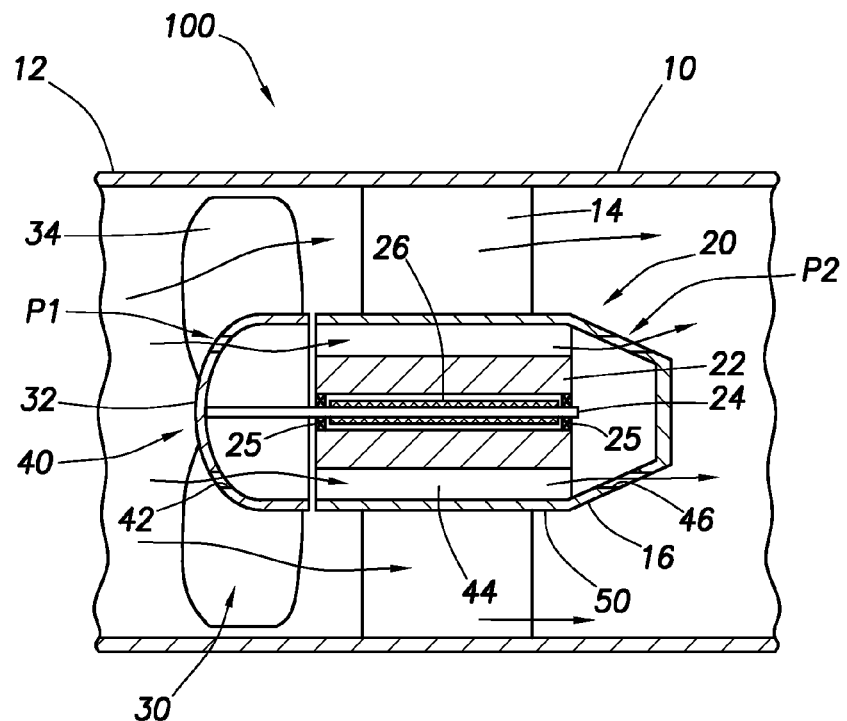
FIG. 1 shows a cooling fan constructed in accordance with embodiments of the invention.

Referring now to FIG. 1, cooling fan 100 comprises outer housing 10, motor 20, blade assembly 30, and motor cooler 40. Outer housing 10 comprises outer wall 12, struts 14, and motor housing 16. Motor 20 comprises windings section 22, axle 24, bearings 25, and magnets 26. Blade assembly 30 comprises a plurality of blades 34 extending from a hub 32 that is connected to axle 24. Motor cooler 40 comprises inlet openings 42 in hub 32, flow paths 44 through windings section 22, and outlet openings 46 in motor housing 16. Motor housing 16 and hub 32 form a motor enclosure 50 that substantially surrounds motor 20.

As current is supplied to windings section 22, blade assembly 30 rotates such that blades 34 generate a flow of air through housing 10 and around motor enclosure 50. As the velocity of air moving through housing 10 increases, the air pressure decreases creating an area of lowered downstream pressure. Outlet openings 46 are disposed within this area of lowered downstream pressure. Thus, when air is flowing through housing 10, the air pressure P1 proximate to inlet openings 42 is greater than the air pressure P2 proximate to outlet openings 46. This pressure differential draws air into inlet openings 42, through flow paths 44, and to outlet openings 46. Once the air passes through outlet openings 46 it mixes with the airflow that traveled around motor enclosure 50 and exits housing 10.

Motor cooler 40 thus generates a flow of air through motor enclosure 50. This flow of air passes directly over windings section 22. As the air passes over windings section 22, heat generated by the windings section is transferred to the air. This heat transfer decreases the temperature of windings section 22. By decreasing the temperature of windings section 22, motor cooler 40 may allow motor 20 to be operated at a higher power. The airflow across motor 20 also helps to reduce the temperature of bearings 25 and may reduce the degradation of grease used in the bearings and may allow for the use of lower cost bearings and grease. Thus, reducing the temperature of bearings 25 may increase the life and performance of the bearings. Reducing the temperature of motor 20 also potentially improves the useful life of the motor by reducing the thermal loads on the motor.

Figure 2:
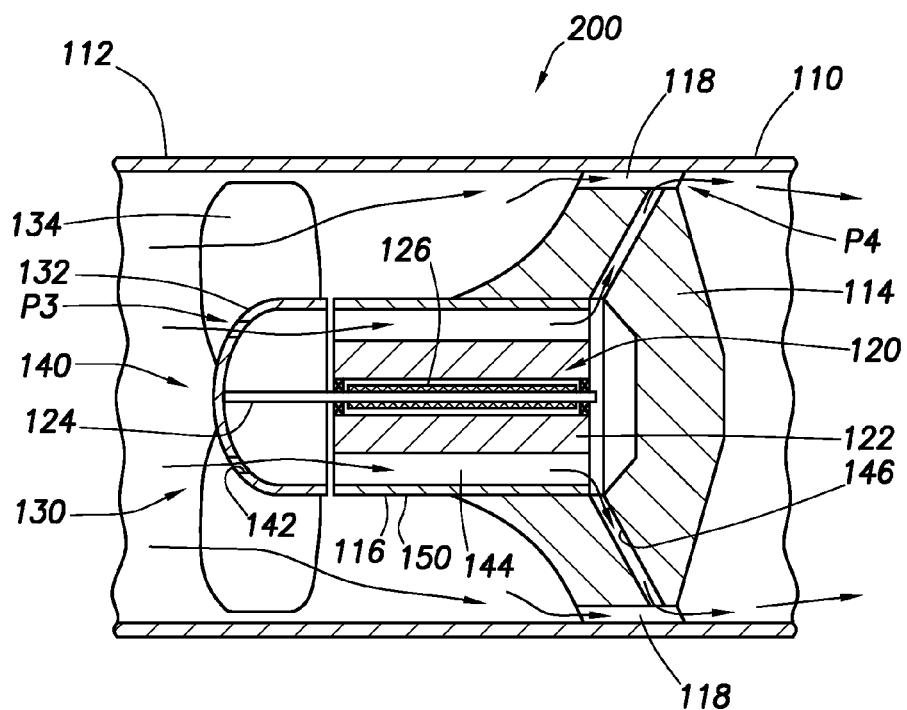
FIG. 2 shows a cooling fan constructed in accordance with embodiments of the invention.

Referring now to FIG. 2, cooling fan 200 comprises outer housing 110, motor 120, blade assembly 130, and motor cooler 140. Struts 114 project inward from wall 112 of outer housing 110 and support a motor housing 116. Struts 114 form contractions 118 in the airflow where the velocity of the air increases. Contractions 118 may be a venturi, restriction in the flow path, or other feature that decreases pressure by increasing flow velocity. Motor 120 comprises windings section 122, axle 124, and magnets 126. Blade assembly 130 comprises a plurality of blades 134 extending from a hub 132 that is connected to axle 124. Motor housing 116 and hub 132 form a motor enclosure 150 that substantially surrounds motor 120. Motor cooler 140 comprises inlet openings 142 in hub 132, flow paths 144 through windings section 122, and outlet passages 146 in fluid communication with contractions 118.

As air passes through contractions 118, the velocity of the air increases and the pressure decreases creating an area of lowered downstream pressure. Outlet passages 146 are disposed within this area of lowered downstream pressure. Thus, when air is flowing through housing 110, the air pressure P3 proximate to inlet openings 142 is greater than the air pressure P4 proximate to outlet passages 146. The pressure differential between P3 at inlets 142 and P4 at outlets 146 draws air through flow paths 144. Contractions 146 may be formed by struts 114, or on other features found within housing 110, such as stator vanes or wire guides.

Figure 3:
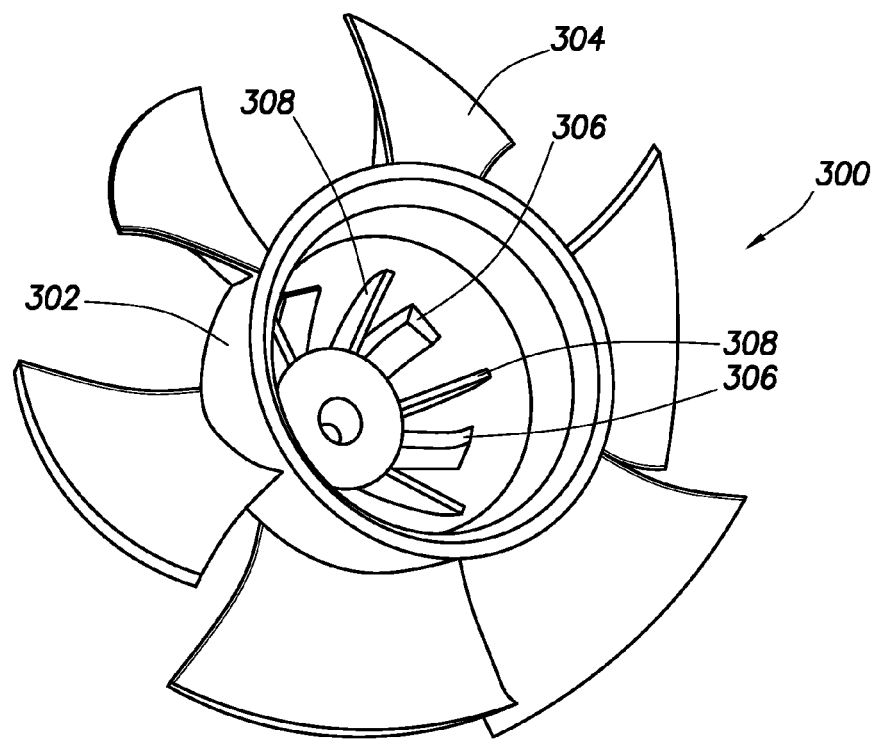
FIG. 3 shows a blade assembly constructed in accordance with embodiments of the invention.

Referring now to FIG. 3, a blade assembly 300 comprises hub 302, blades 304, scooped apertures 306, and air dams 308. Blade assembly 300 can be used with either of the motor cooling systems above or can be used independently so as to generate an airflow over a motor that is disposed in line with, and downstream from, the blade assembly. As blade assembly 300 is rotated, scooped apertures 306 pull air into the interior of hub 302. Air dams 308 then redirect the air axially from hub 302 toward a motor in line with blade assembly 300. The scooped apertures 306 and air dams 308 cooperate to further increase the air pressure near the hub to allow for a greater pressure differential and therefore increased airflow through the motor housing.

Figure 4:
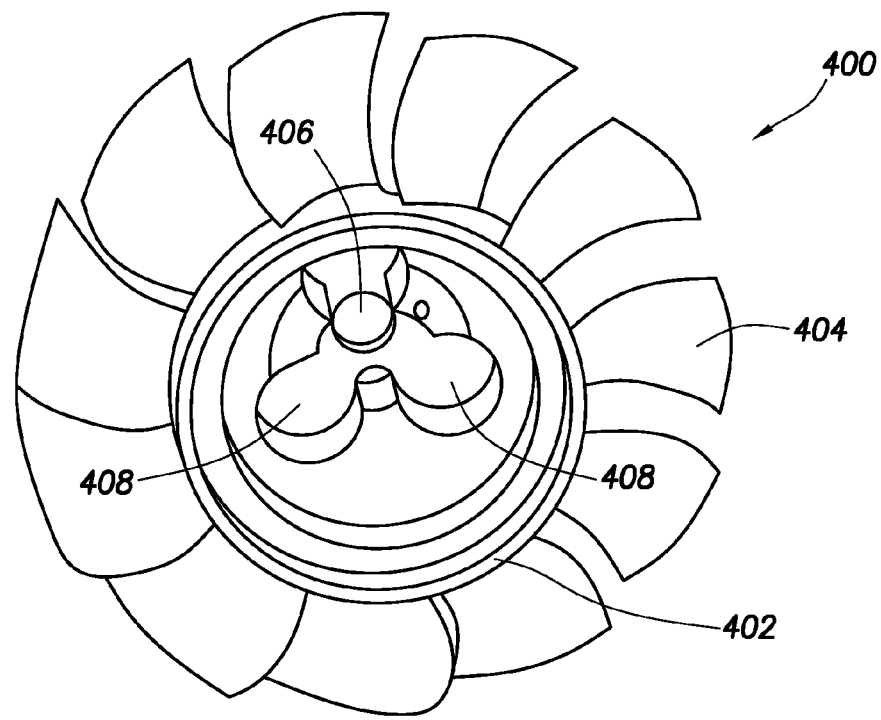
FIG. 4 shows a blade assembly constructed in accordance with embodiments of the invention.

Referring now to FIG. 4, a blade assembly 400 comprises hub 402, blades 404, a single aperture 406, and chambers 408. Blade assembly 400 can be used with either of the motor cooling systems above or can be used independently so as to generate an airflow over a motor that is disposed in line with, and downstream from, the blade assembly. As blade assembly 400 is rotated, air enters chamber 408 through aperture 406. Chambers 408 allow airflow expansion and mixing before the air moves across an adjacent motor. Single aperture 406 minimizes penetrations through hub 402, thereby preserving the strength of the hub.

Figure 5:
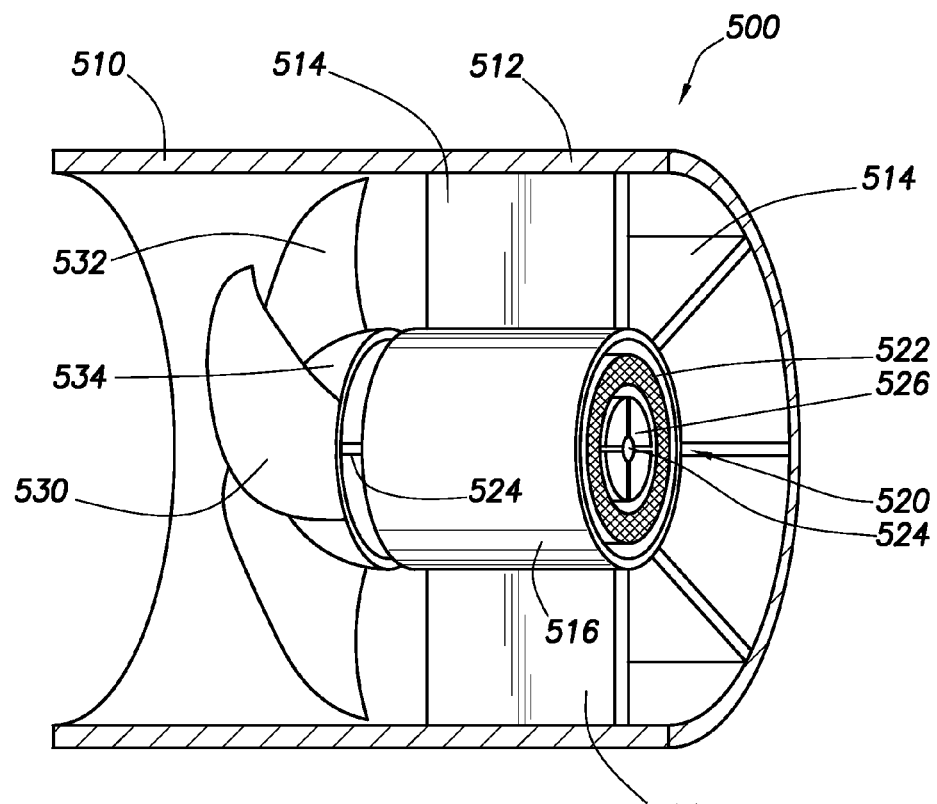
FIG. 5 shows a cooling fan constructed in accordance with embodiments of the invention.

Referring now to FIG. 5, cooling fan 500 comprises outer housing 510, motor 520, and blade assembly 530. Outer housing 510 comprises outer wall 512, stators or struts 514, and motor housing 516. Motor 520 comprises windings section 522, axle 524, and magnets 526. Blade assembly 530 comprises a plurality of blades 532 extending from a hub 534 that is connected to axle 524. Stators 514 and motor housing 516 are thermally coupled, such as by over-molding a thermally conductive material onto windings section 522 or disposing a thermally conductive material between stators 514 motor housing 516. In certain embodiments, stators 514 may comprise, or be thermally coupled to, other heat transfer elements, such as heat pipes, vapor chambers, or liquid cooling systems that dissipate heat from motor 520. This assembly creates a thermal conduit that transfers heat from windings section 522 into stators 514, which are disposed within the air flow generated by blade assembly 530.

Figure 6:
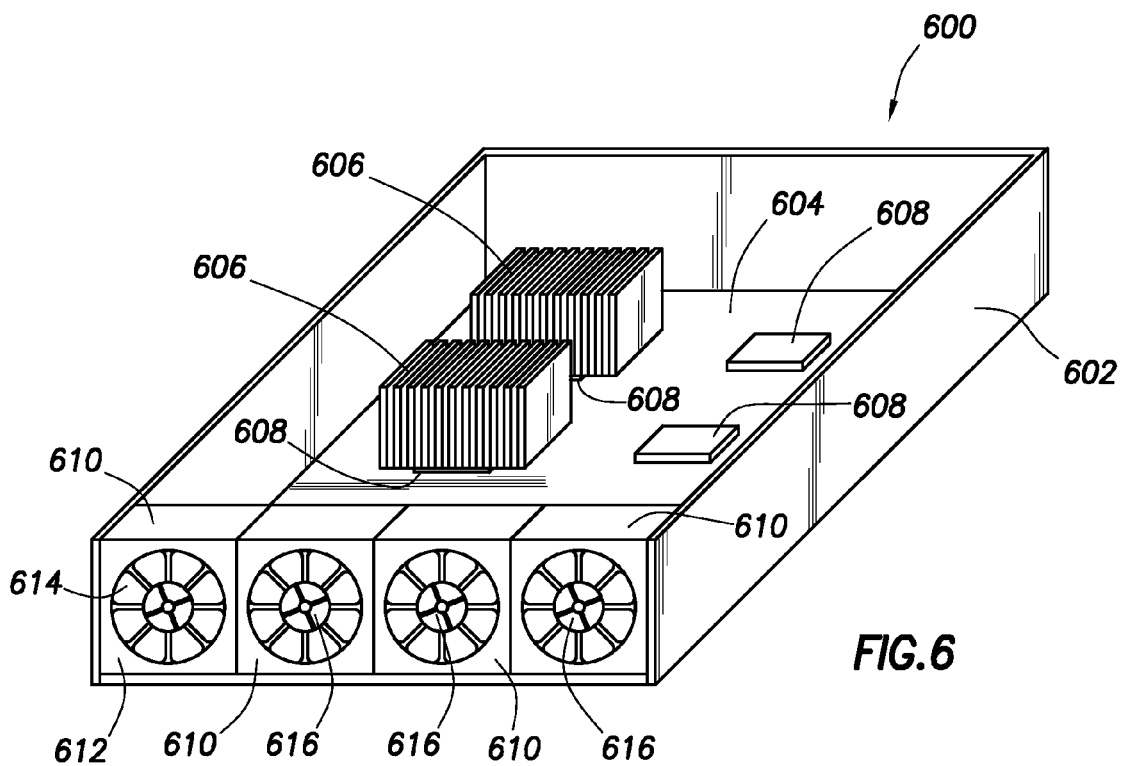
FIG. 6 shows a computer system comprising cooling fans constructed in accordance with embodiments of the invention.

Referring now to FIG. 6, a computer assembly 600 comprises chassis 602, motherboard 604, heat sinks 606, electronic components 608, and cooling fans 610. Each cooling fan 610 comprises a housing 612 surrounding a blade assembly 614 that is rotated by an electric motor that is cooled by a motor cooler 616. Cooling fans 610 are arranged so as to generate an airflow that cools electronic component 608. Heat sinks 606 may be arranged so as to be directly in the airflow generated by fans 610. Heat sinks 606 are coupled to electronic components so that the heat generated by the electronic component is dissipated to the airflow through the increased surface area of the heat sink.

The above discussion is meant to be illustrative of the principles and various embodiments of the present invention. Numerous variations and modifications will become apparent to those skilled in the art once the above disclosure is fully appreciated. For example, the openings into the motor housing may be arranged such that the airflow across the motor flow in a direction opposite the flow generated by the fan blades. It is intended that the following claims be interpreted to embrace all such variations and modifications.

What is claimed is:

1. A cooling fan comprising:
   an outer housing;
   a motor support fixed to said outer housing;
   a motor mounted to said motor support;
   a hub rotatably coupled to said motor, wherein said hub and said motor support form a motor enclosure that substantially surrounds said motor;
   a plurality of blades extending radially from said hub, wherein said plurality of blades are arranged so as to generate a flow of air around the motor enclosure when said blades are rotated; and
   a motor cooler comprising a flow path through the motor enclosure, wherein the flow path has a first opening and a second opening, wherein the second opening is disposed within an area of lowered downstream pressure so as to develop a differential pressure between the first and second openings and generate a flow of air through the motor enclosure as said motor operates;
   wherein the second opening is disposed within a contraction of the flow of air around the motor enclosure; and
   wherein the second opening comprises a venturi in fluid communication with the flow of air around the motor enclosure.

* * * * *

UNITED STATES PATENT AND TRADEMARK OFFICE
CERTIFICATE OF CORRECTION

| | | |
|---|---|---|
| PATENT NO. | : 7,976,291 B2 | Page 1 of 1 |
| APPLICATION NO. | : 12/211659 | |
| DATED | : July 12, 2011 | |
| INVENTOR(S) | : Wade D. Vinson | |

It is certified that error appears in the above-identified patent and that said Letters Patent is hereby corrected as shown below:

On the Title page, in field (75), Inventors, in column 1, lines 3-4,
delete "Jeffrey M. Giardina," and insert -- Jeffery M. Giardina, --, therefor.

Signed and Sealed this
Tenth Day of January, 2012

David J. Kappos
*Director of the United States Patent and Trademark Office*